J. H. Manny.
Mower.

No. 11,810  Patented Oct. 17, 1854.

J. H. Manny.
Mower.
No. 11,810    Patented Oct. 17, 1854.

UNITED STATES PATENT OFFICE.

JOHN H. MANNY, OF FREEPORT, ILLINOIS.

IMPROVEMENT IN GRAIN AND GRASS HARVESTERS.

Specification forming part of Letters Patent No. 11,810, dated October 17, 1854; antedated June 15, 1854.

*To all whom it may concern:*

Be it known that I, JOHN H. MANNY, of Freeport, in the county of Stephenson and State of Illinois, have invented a new and useful Improvement in Harvesting-Machines, of which the following is a full, clear, and exact description, reference being had to the accompanying drawings of the same, which make part of this specification, and in which—

Figure 1:
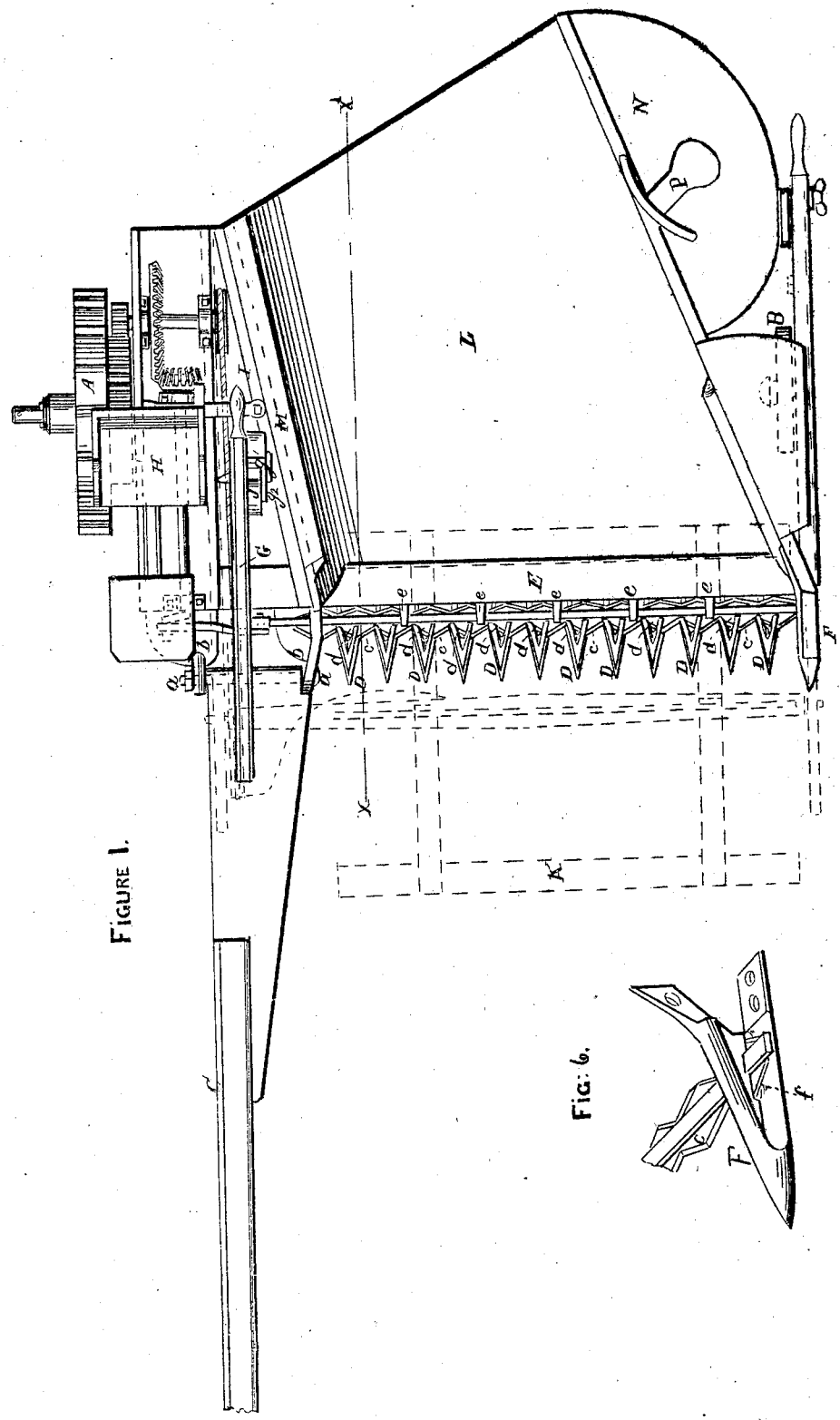
Figure 6:
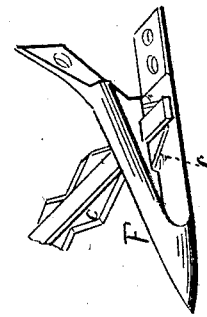
Figure 4:
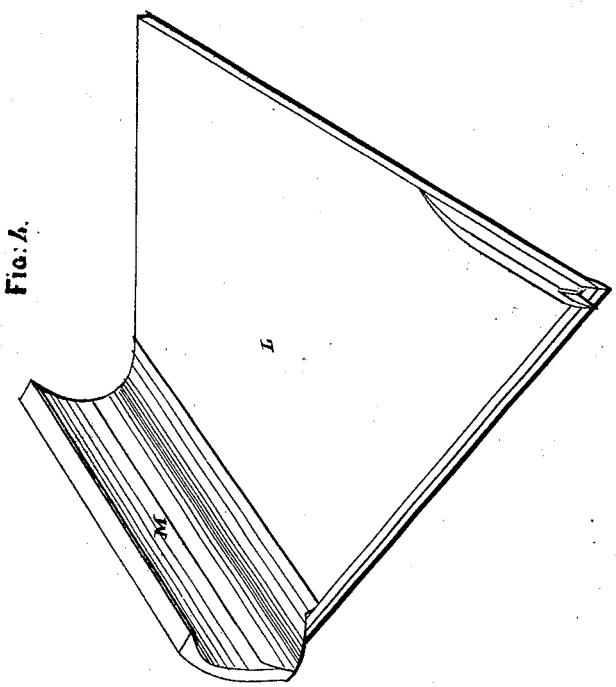
Figure 5:
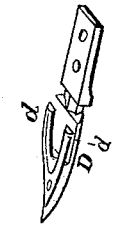
Figure 2:
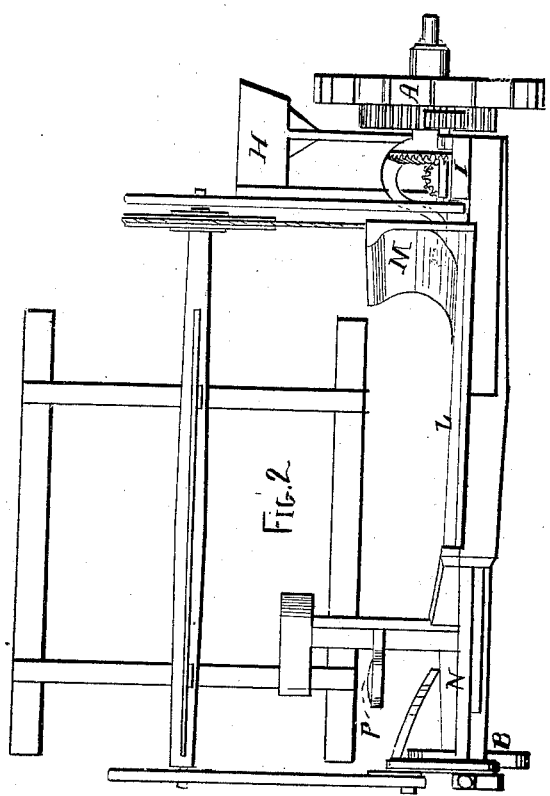
Figure 3:
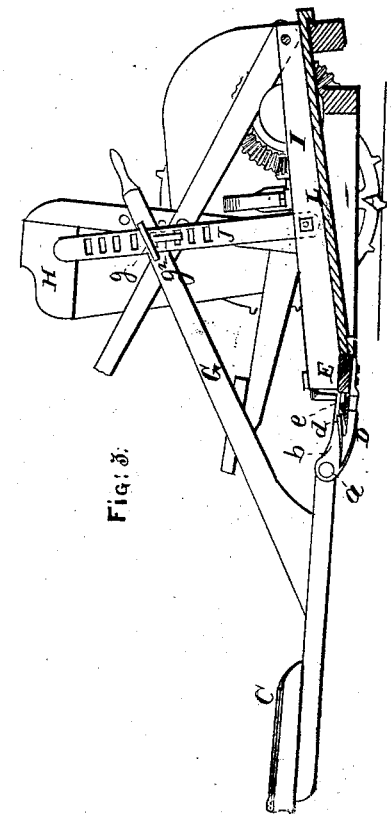

Figure 1 represents a top view of a machine embracing my improvements. Fig. 2 represents a rear end view of the same. Fig. 3 represents a section at the line $x\,x$ of Fig. 1, with the concave wing of the platform removed to show the arrangement for adjusting the cutters at varying distances from the ground. Fig. 4 represents a view in perspective of the oblique platform and its concave wing detached from the machine. Fig. 5 represents a similar view of one of the guard-fingers and its pronged cap, and Fig. 6 a similar view of the hollow dividing-point at the inner end of the machine and that portion of the cutter which has its bearing therein.

My invention consists in so arranging the seat of the raker and constructing and arranging the platform that the grain can be discharged either in compact bundles or in gavels spread out the whole width of the platform, but at such a distance from the standing grain as will leave a clear track for the team to travel in while drawing the machine to cut the succeeding swath.

My invention further consists in combining with a platform projecting back obliquely from the cutter-bar a concave wing, against which the raker gathers the cut grain and presses it into a comparatively compact bundle, and then slides it off on the ground, where it is left in a suitable condition for being bound, thus saving much time and labor by relieving the binder from the necessity of raking up gavels scattered over a considerable ground preparatory to binding, as he must do when grain is deposited in the usual manner.

My invention further consists in making the outside finger which separates the grain to be cut from that which is to be left standing hollow, for the purpose of preventing the entanglement of wire-grass therein and the consequent obstruction of the sickle, which takes place so frequently when this divider is made solid in the usual manner.

My invention further consists in the arrangement of an arm mounted directly on the pole and an upright supporting-bar pivoted to the frame of the platform, whereby the cutters can be conveniently adjusted to cut grain at different heights from the ground by the driver without his removal from his seat.

The accompanying drawings represent a harvesting-machine constructed with my improvements. It is supported on two wheels, A and B, and provided with driving-gear suitable for giving motion to the cutters and reel; but as the construction and arrangement of the driving-gear and reel is not new, I deem it unnecessary to describe them particularly.

The tongue C, by which the horses draw the machine, is attached to the front edge of the frame by means of a bolt, $a$, passing through ears $b$ and forming a hinge-joint, which allows the front of the frame to be elevated or depressed.

On the pole C an inclined arm, G, is placed, which extends upward and backward within reach of the driver, whose seat H is mounted on the frame I. This arm G has a staple, $g$, projecting from its side, through which an upright bar, J, passes, whose lower end is pivoted to the frame I. This pivoted bar J has a series of holes in it, into any one of which a strong pin, $g^2$, is inserted to hold the arm G in place. By this arrangement it is obvious that when the arm G is raised or lowered it will impart a corresponding movement to the front edge of the machine which carries the cutter apparatus, so that the adjustment of the cutters to cut the grain according to its growth is made by raising or lowering the arm G on the bar J. The axles of the supporting-wheels constitute the fulcra upon which the frame turns.

Instead of making the guard-fingers D, which support the grain laterally against the action of the cutter $c$, with solid or perforated caps I construct the caps with prongs $d$, sharp on both their inner and outer edges, and united at their front ends, but open and disconnected over the cutter, so as to leave a free opening between their ends as well as between them and the front bar, E. This construction prevents the teeth from becoming entangled with an accumulation of wire-grass, gum, and other obstructions. The short arms $e$ project over the sickle and hold it down to the fingers. These are necessary in consequence of the shortening of the caps, which prevents them from doing the duty as heretofore of holding the cutter down.

The dividing-bar F projects in advance of the guard-fingers and divides the grain to be cut from that which is to be left standing. It has a slot, *f*, made in its inner side, through which the end of the sickle plays. This dividing-bar F is made hollow, as represented. The stock of the sickle has not sufficient breadth of bearing in this divider for grass to effect a lodgment and clog the sickle.

The reel K is represented in Fig. 1 by blue lines. The platform L extends obliquely from the cutters. It also extends obliquely to the track made by the machine, and as it extends backward diverges from the grain left standing. The obliquity of this platform is such that when the grain is delivered upon the ground it will be far enough removed from the standing grain to leave a clear track between them for the team to travel in while drawing the machine to cut the next swath.

On the outer side of the oblique platform is mounted a wing, M, whose length is the same as the platform at that side, and whose inner side is made concave. Against this concave wing the raker presses the cut grain into a compact mass previous to delivering it upon the ground, when he uses a fork to sweep the grain off the platform.

At the rear end of the inner side of the platform a stand, N, is arranged, upon which a seat, P, is mounted for the raker. The position of this seat is such that the raker can sit or stand, and, if he chooses, draw the grain back in discharging it in nearly a direct line from the cutters. By means of a rake which extends nearly the full width of the platform the raker draws the cut grain directly backward and delivers it upon the ground behind the platform. In discharging the grain with a fork the raker first gathers it from the left side of the platform to the right, pressing it against the concave guard to form it into a compact bundle, and then slides it off.

What I claim as my invention, and desire to secure by Letters Patent, is—

1. The arrangement of the platform obliquely to the cutter, so that the gavels of cut grain will be discharged at a sufficient distance from the standing grain to leave a clear pathway between the two for the team to travel in.

2. The combination, with the platform, of a wing to facilitate the gathering of the grain, as herein described.

3. Making the outside dividing-finger hollow, so that while it affords sufficient room for the play of the end of the sickle the bearing of the latter thereon will not be so wide as to afford a lodgment of gum, grass, &c., and render it liable to be clogged thereby.

In testimony whereof I have hereunto subscribed my name.

JOHN H. MANNY.

Witnesses:
JOHN L. SMITH,
J. F. WALLARD.